United States Patent Office 3,583,892
Patented June 8, 1971

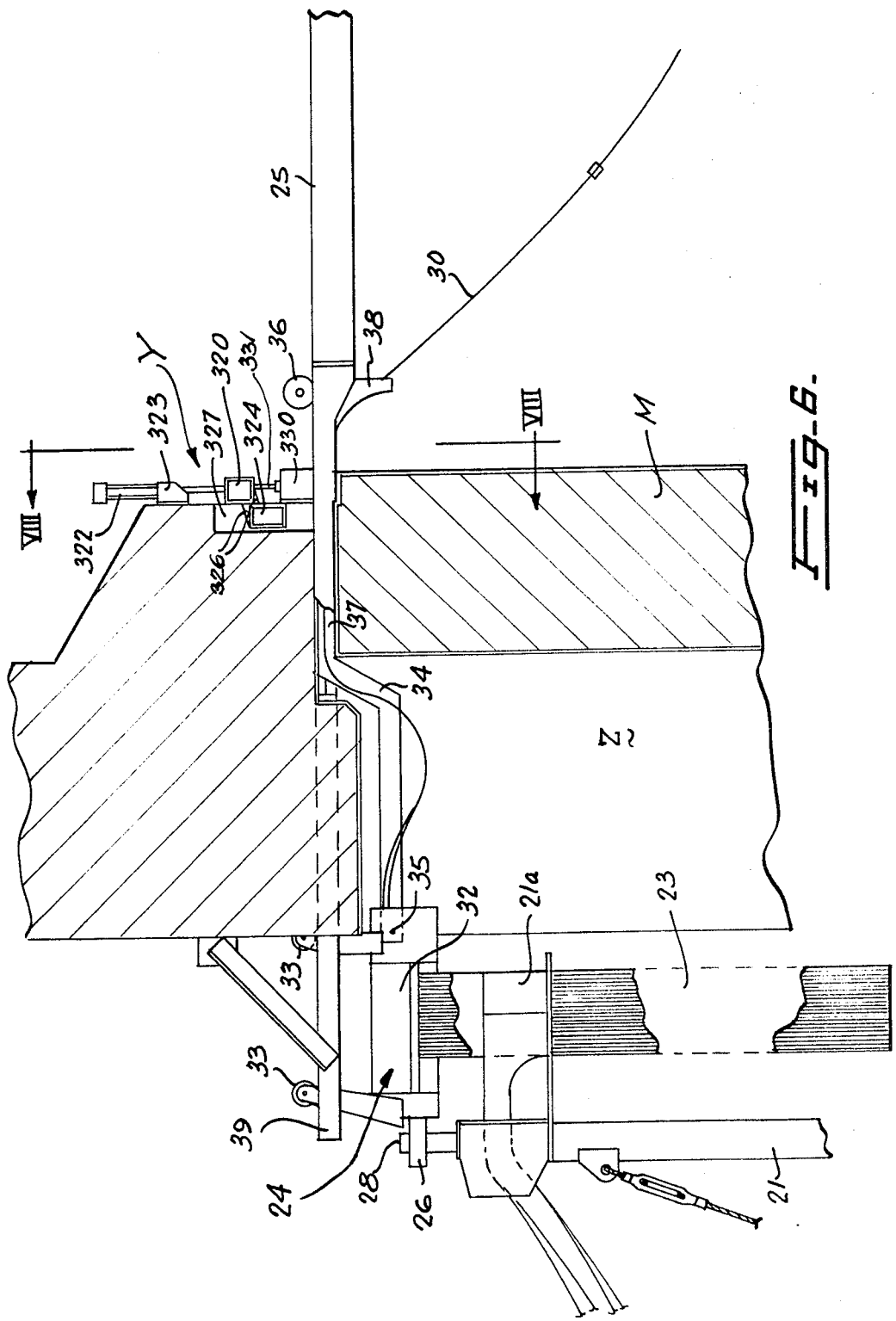

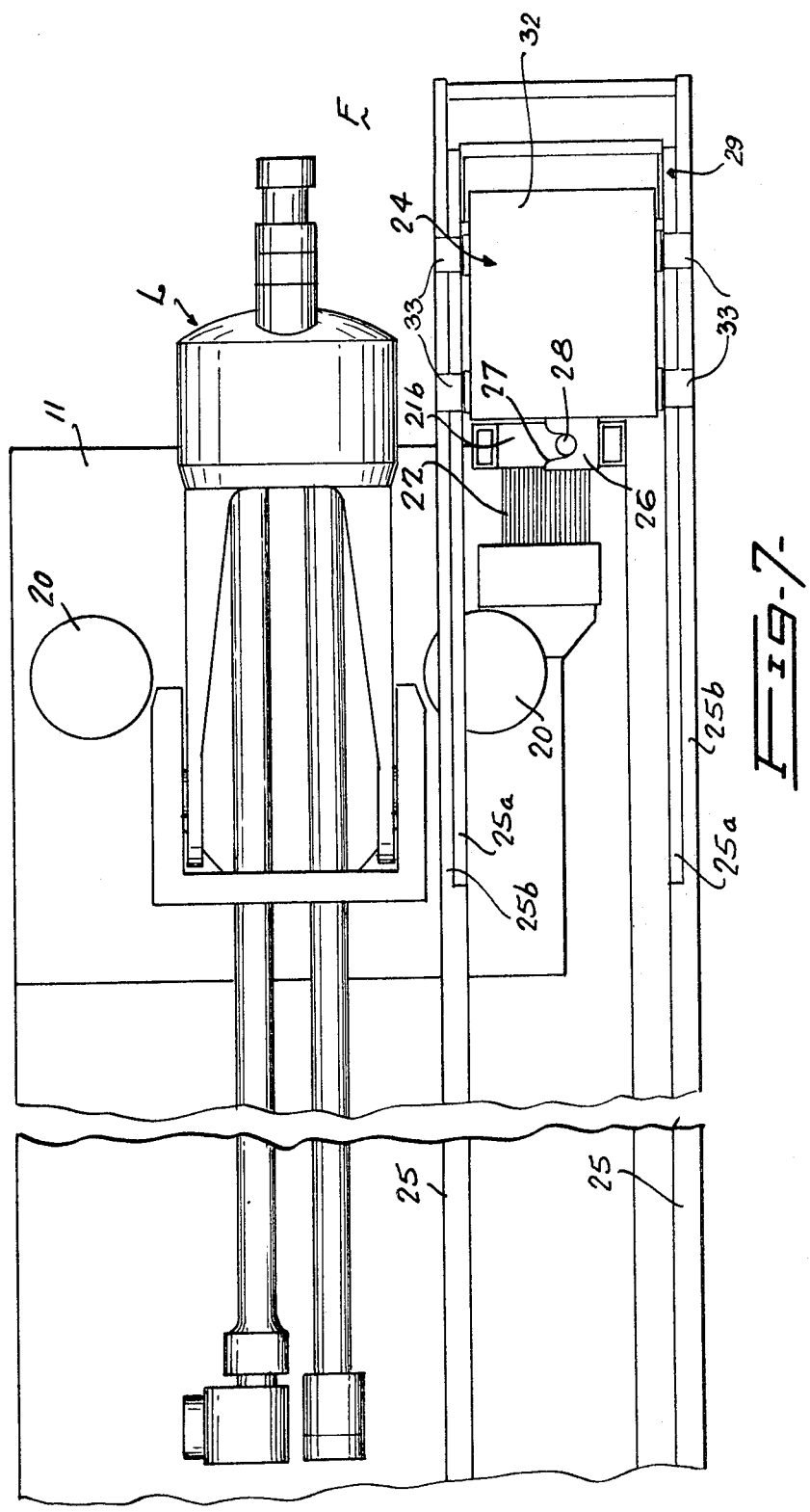

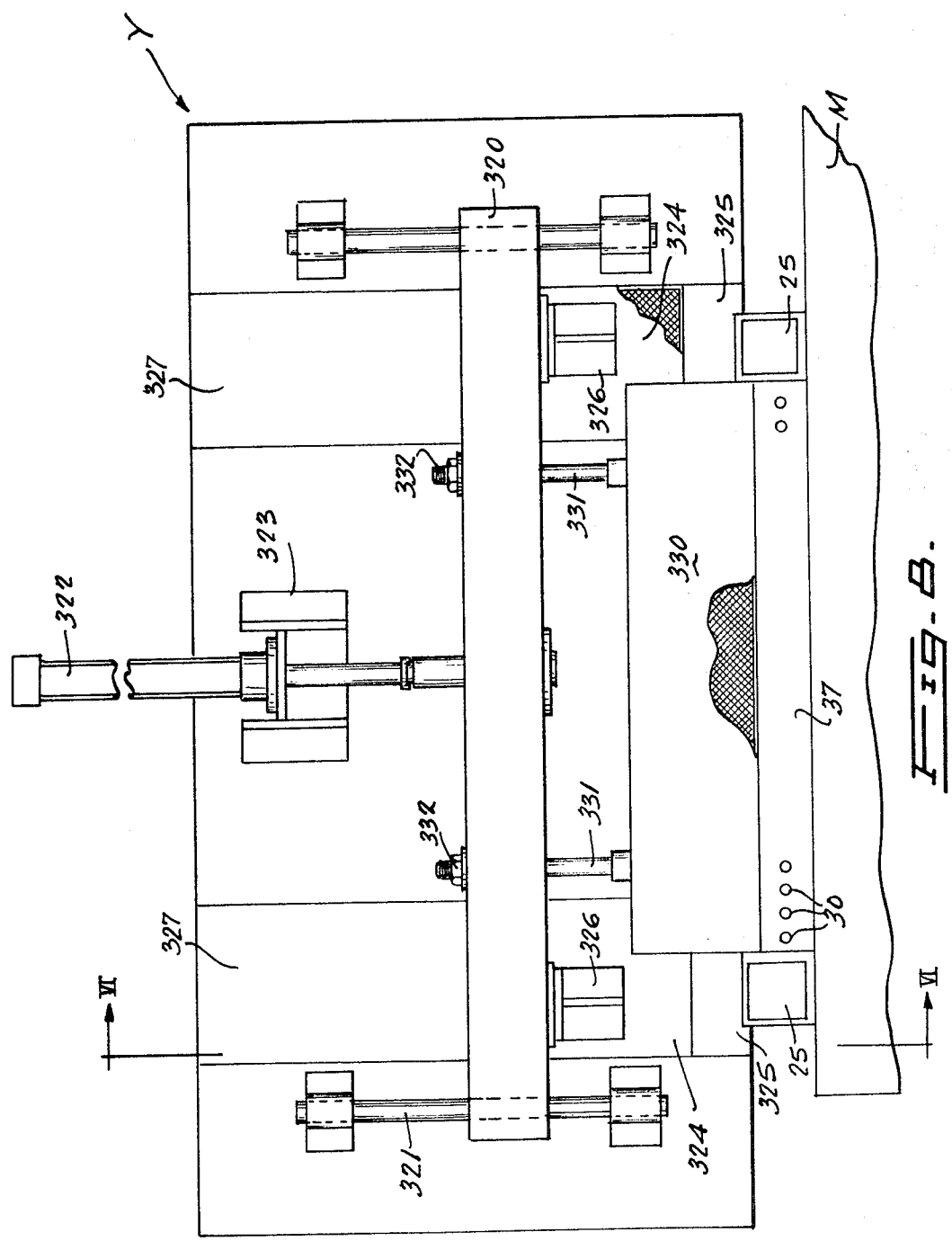

3,583,892
NUCLEAR REACTOR INSTALLATION
Peter Isaac, Cooksville, Ontario, Canada, assignor to Atomic Energy of Canada Limited, Ottawa, Ontario, Canada
Filed Apr. 15, 1968, Ser. No. 721,408
Int. Cl. G21c 17/00
U.S. Cl. 176—30                                10 Claims

ABSTRACT OF THE DISCLOSURE

A fuelling machine operates in a fuelling vault arranged underneath a reactor for loading and unloading fuel channels extending into the fuelling vault. A maintenance bay is arranged adjacent to the fuelling vault and separated therefrom by a door and a shielding gate. Hydraulic pressure required for the various motions of the fuelling machine is supplied via a plurality of cables connecting the fuelling machine to a fixed point in the maintenance bay. In order not to impede the motion of the fuelling machine, the cables are suspended on a post mounted on a carriage supporting the fuelling machine as well as from a trailer engaging a pair of rails that extend across the maintenance bay. The trailer has an extended portion which serves to guide the cables through the passage between the fuelling vault and the maintenance bay and to cooperate with the shielding gate, when the fuelling machine is in the fuelling vault.

---

Reference is made to related co-pending U.S. patent application Ser. Nos. 721,293 to 721,295, 721,358, 721,409 and 721,410 all filed on Apr. 15, 1968.

The present invention relates to a nuclear reactor installation comprising a reactor, preferably of the heavy water type, and a fuelling machine for loading and unloading fuel channels of the reactor while the latter remains on power.

The fuelling machine operates in a fuelling cell into which there extend the ends of the reactor fuel channels that have to be refuelled as well as the ends of fuel transfer tubes for supplying fresh fuel and removing spent fuel. For any necessary repairs to the fuelling machine and also for normal preventative maintenance, it is most desirable to be able to shut down the fuelling system without interfering with the reactor operation and to be able to do so with safety to personnel.

The present invention provides substantial advantages in this regard by providing a maintenance cell adjacent the fuelling cell,
a passage between the fuelling cell and the maintenance cell and means for tightly closing the passage,
means for moving the fuelling machine between the cells through the passage, and
power supply means including conductor means mounted in one of the cells, flexible cable means connecting the fuelling machine to the conductor means and movable means for supporting the cable means hanging freely between the fuelling machine and the conductor means to avoid interference of the cable means with the motion of the fuelling machine.

Such installation allows repair or maintenance of the machine with the refuelling system on power and during reactor operation.

In a preferred embodiment of this invention the cable supporting means comprise a trailer which serves to form a first cable span between the conductor and the trailer and a further cable span between the trailer and the fuelling machine, and which trailer includes means for guiding the cable means through the passage and acting as part of the closure means when the fuelling machine is in the cell not containing the conductor means.

A further important feature of this invention resides in the fact that the cable supporting means are not controlled by the cable means but by the motions of the fuelling machine itself, and the arrangement is such that there is no danger of the cable means becoming damaged by physical stresses or of their impeding the motion of the fuelling machine.

Further features of the present invention will appear from the following specific description which is provided by way of example only. In the accompanying drawings:

FIG. 6 shows a detail of FIG. 2 on an enlarged scale, a portion of this figure being a section on the line VI—VI in FIG. 8;

FIG. 7 is an enlarged scale plan view taken on the line VII—VII in FIG. 5; and

FIG. 8 is a side view seen on the line VIII—VIII or FIG. 6.

OVERALL ARRANGEMENT OF FUELLING SYSTEM

Figure 1:
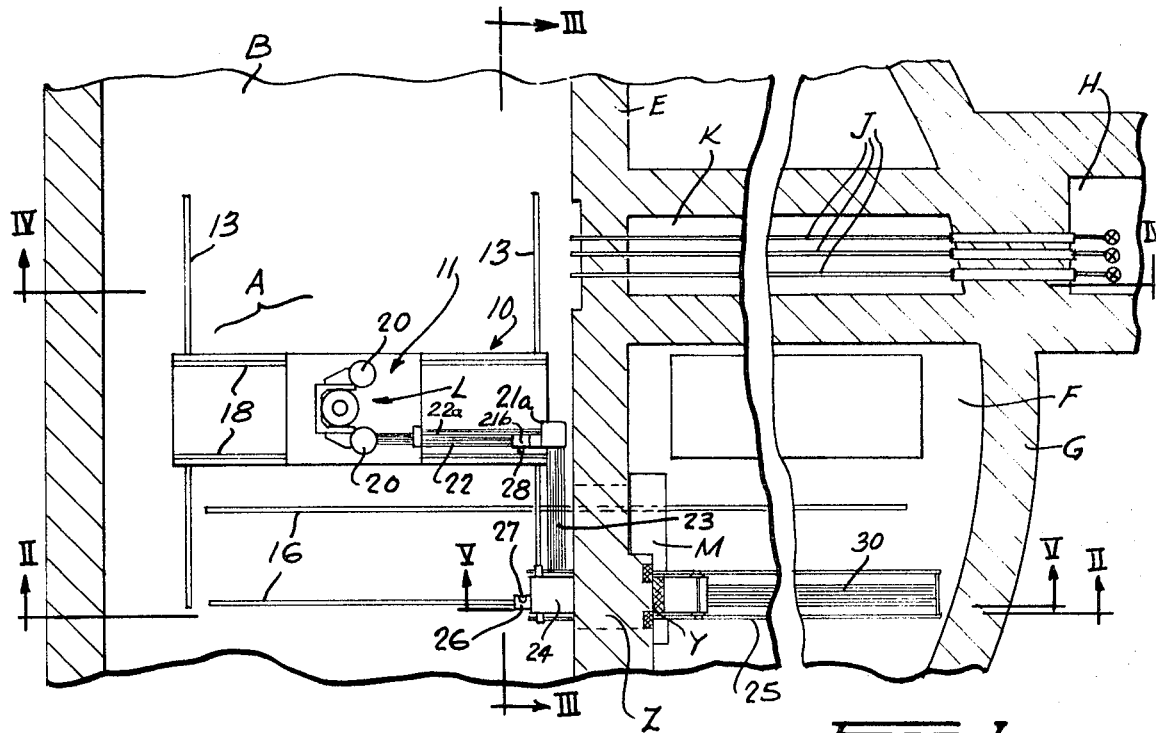
FIG. 1 is a cut-away plan view taken generally on the line I—I in FIG. 2 of a fuelling system associated with a nuclear reactor.

FIGS. 1 to 5 illustrate the overall arrangement of a fuelling machine A located in a cell B in the form of a vault beneath a nuclear reactor vessel C having a plurality of fuel channels D that are required to be kept supplied with strings of nuclear fuel. The building E in which the reactor C is housed is also constructed with a maintenance cell F in the form of a bay adjacent the fuelling vault B, in which bay F the fuelling machine A is serviced. A sliding door M closes a doorway Z between the vault B and the bay F. Outside the circular outer wall G of the reactor building E there is a fuel shuffling bay H, only a portion of which is shown in FIG. 1, no details of which are given. Leading from the fuel shuffling bay H to the fuelling vault B are three fuel transfer tubes J that extend through a fuel transfer bay K.

FUELLING MACHINE—GENERAL

Figure 2:
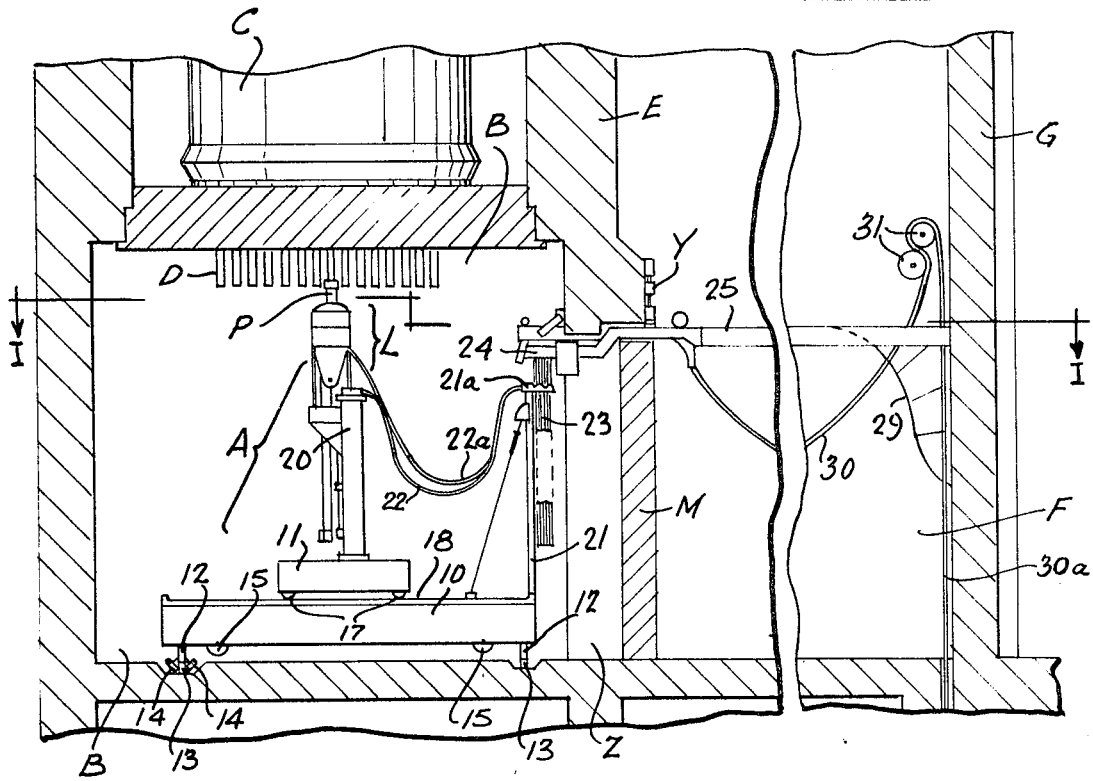
FIG. 2 is a cut-away elevation view seen on the line II—II in FIG. 1.
Figure 3:
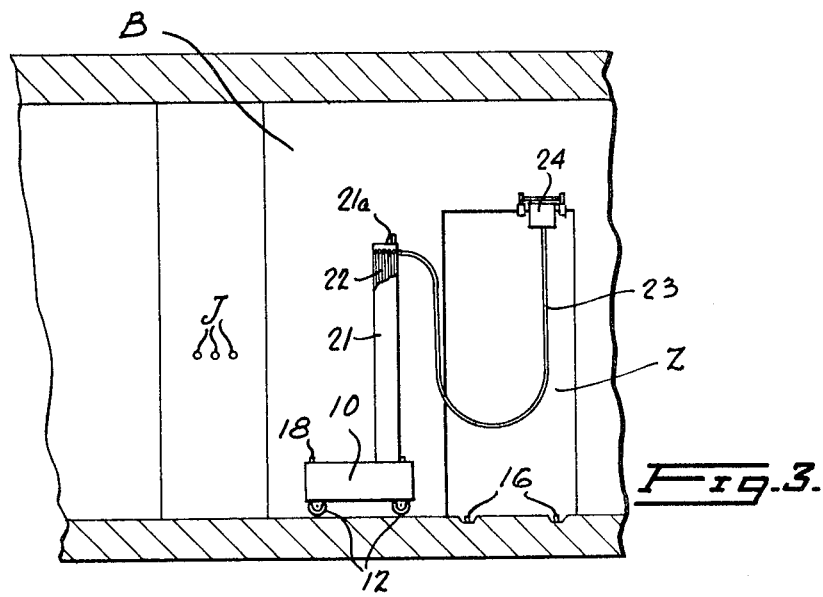
FIG. 3 is a section seen on the line III—III in FIG. 1.

Still referring to FIGS. 1 to 5, the fuelling machine A will be seen to comprise a main carriage 10 along which a trolley 11 can travel. The carriage 10 is provided with four wheels 12 for travel along the fuelling vault B on rails 13, small subsidiary wheels 14 serving to keep the main wheels 12 engaged with the rails 13. The carriage 10 also has a set of four wheels 15 that are normally raised in the position shown in FIG. 2 when the machine A is operating in the fuelling vault B. When it is desired to move the machine A from the vault B to the maintenance bay F, the wheels 15 are lowered (FIG. 5) to engage tracks tracks 16 (FIGS. 1 and 3). To carry out the required movements, all the wheels 12 and 15 are connected to be driven by hydraulic motors (not shown) in a conventional manner.

Movement of the trolley 11 along the main carriage 10 is effected by means of a set of wheels 17 cooperating with rails 18, the wheels 17 also being driven by one or more motors (not shown). Mounted to project upwardly from the trolley 11 is a pair of spaced apart columns 20 that serve to support a machine head L.

CABLE ARRANGEMENT

Figure 5:
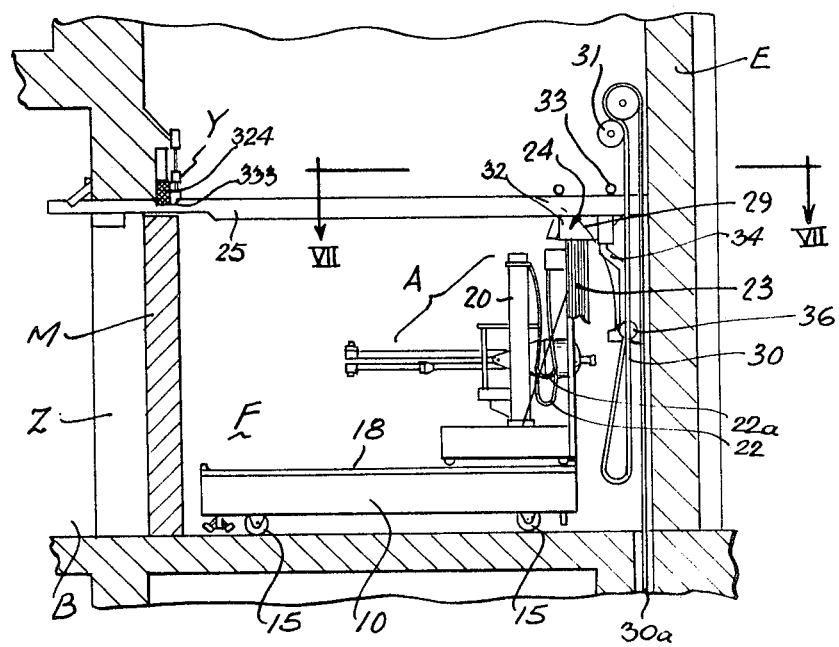
FIG. 5 is a section taken on the line V—V in FIG. 1 except that the movable parts are now in another different position.

Still referring to FIGS. 1 to 5, it will be seen that the main carriage 10 carries at one end an upwardly projecting post 21 having a horizontally extending head portion 21a. A pair of cable spans 22 and 22a connects the head portion 21a of the post 21 to the head of one of the columns 20 on the trolley 11 as well as to the machine head L, respectively, such spans 22 and 22a having sufficient slack to enable the trolley 11 to travel to the end of the carriage 10 remote from the post 21. When the trolley 11 moves to the end of the carriage 10 nearer to the post 21, the spans 22, 22a hang down loosely (FIG. 5).

From the head portion 21a of the post 21, the hydraulic power and control connections are established through a further span 23 of cables that extends from the post 21 to a trailer 24 that is mounted on wheels and is arranged for travel on elevated rails 25 extending between the vault B and the maintenance bay F.

When the main carriage 10 travels along the fuelling vault B to a position adjacent the fuel transfer tubes J, that is to the left in FIG. 3, the cable span 23 is extended. Conversely, when the carriage 10 is moved to the right in FIG. 3, this span 23 hangs down loosely. The carriage 10 will of course be moved to this latter position prior to lowering of its wheels 15 for movement of the machine A out of the fuelling vault B and through the open doorway Z into the maintenance bay F. This operation is demonstrated by FIG. 5 which shows the carriage 10 at the extreme end of its travel into the maintenance bay F. It will be seen that an extension 34 of the trailer 24 has moved down a curved extension 29 of the rails 25. A further span 30 of cables extends between the trailer 24 and suitable fixed conductor means, which in the specific embodiment comprises a pair of rollers 31 mounted above the maintenance bay F and a length of bunched cables 30a leading from external power and control sources (not shown).

As shown in FIGS. 1, 6 and 7, the trailer 24 is at its left hand end provided with a bracket 26 having a slot 27 that faces in the direction of the rails 13. A vertically extending pin 28 is attached to an extension 21b of the head portion 21a of the post 21. The bracket 26 and the pin 28 together form a coupling which is engaged when the carriage 10 moves along the rails 13 to the position in which the wheels 15 may be lowered to engage the tracks 16. As the carriage 10 travels along the tracks 16, the trailer 24 is guided along the rails 25 by means of this coupling.

A shielding gate Y is mounted above the door M and can be raised to allow the trailer 24 to travel from its operating position shown in FIG. 2 to its maintenance position shown in FIG. 5.

While it has been stated that hydraulic motors are preferably used to carry out the diverse motions of the fuelling machine, it is understood that electric or pneumatic motors could be used instead, and that the expressions "cable" and "cable means" cover any means of similar elongated and flexible physical nature for transporting the respective type of energy and control signals to the machine.

CONSTRUCTION OF TRAILER

With reference to FIG. 6, the trailer 24 comprises a cart 32 having four wheels 33 engaging the rails 25. The extension 34 is pivoted at one end to the cart 32 for rotation about an axis 35, and at its remote end is provided with two wheels 36 which also engage the rails 25. The cables 30 are embedded in a portion 37 of the extension 34, and this portion is disposed between the rails 25, as shown in FIG. 8. The outer end of the portion 37 is provided with a curved guide 38 which serves to prevent the cables 30 from being sharply bent on leaving the extension 34.

The trailer 24 has two functions. Firstly, the cart 32 serves to re-orient the cables between the span 30, which allows free motion of the carriage 10 along the tracks 16, and the span 23, which allows free motion of the carriage 10 along the rails 13. Secondly, the portion 37 of the extension 34 serves to guide the cable span 30 through the doorway Z and also to close the opening between the rails 25 when the fuelling machine A operates in the fuelling vault B. In this operating position, the wheels 33 of the cart 32 engage a portion 39 of the rails 25 that extends into the fuelling vault B, while the portion 37 of the trailer 24 is disposed above the door M.

At their other end, as shown in FIG. 7, the rails 25 are longitudinally divided into a pair of inner rails 25a and a pair of outer rails 25b. The inner rails 25a are bent down to form the curved extension 29 while the outer rails 25b continue to extend horizontally. The wheels 33 of the trailer cart 32 are provided with rims which engage the entire width of the rails 25, while the wheels 36 of the trailer extension 34 have rims which engage only the inner half of the rails 25. Therefore, in the maintenance position shown in FIGS. 5 and 7, the wheels 33 engage the outer rails 25b thereby maintaining the cart 32 at the same height and the cable span 23 in the same shape as in the fuelling vault B, while the wheels 36 have followed the curved rail extension 29 thereby rotating the trailer extension 34 about the axis 35. In this folded condition of the trailer 24 the space that it occupies in the horizontal direction is less than its horizontal dimension in its operative condition and this fact enables the maintenance bay F to be shortened in this direction.

CONSTRUCTION OF SHIELDING GATE

With reference to FIGS. 6 and 8, the shielding gate Y comprises a horizontally extending bar 320 slidably engaging two fixed vertical guide rods 321. Connected to the upper surface of the bar 320 is the piston of an actuation cylinder 322 fixed to the separation wall between the fuelling vault B and the maintenance bay F by means of a mounting 323. Two sliders 324 are movable in recesses 327 of the separation wall so as to open and close spaces 325 above the rails 25 which spaces are necessary to allow the wheels 33 of the trailer cart 32 to pass from the fuelling vault B into the maintenance bay F. The sliders 324 are rigidly connected to the bar 320 by angle irons 326. A further slider 330 serves to open and close the space between the rails 25 which is partly taken by the portion 37 of the trailer 24 when the fuelling machine A is in the fuelling vault B, and which space is free when the fuelling machine A is in the maintenance bay F. The slider 330 is suspended from the bar 320 by two bolts 331 slidably engaging the bar 320 in a vertical direction. Two nuts 332 mounted on the bolts 331 define the maximum space between the slider 330 and the bar 320.

The shielding gate Y can be moved into three different positions. In an open position, in which the bar 320 is lifted to the upper end of the guide rods 321, the sliders 324 and 330 leave clear the space above and between the rails 25 to allow free movement of the trailer 24 through the doorway Z. A first closed position is assumed when the fuelling machine A is in the maintenance bay F. In this position, the bar 320 is shifted to the lower end of the guide bars 321 so that the sliders 324 bear on the rails 25 and the slider 330 bears on the door M. A second closed position is assumed when the fuelling machine A is in the fuelling vault B and the trailer portion 37 fills part of the space between the rails 25. In this position, the sliders 324 again bear on the rails 25 while the slider 330 now bears on the trailer portion 37. FIG. 8 shows the gate Y intermediate the open and the second closed position.

As shown in FIG. 5, indentations 333 are provided in the upper side of the rails 25 at the location where the sliders 324 bear on the rails 25 in the closed positions. These indentations 333 serve to prevent any radiation from shining along the rails 25.

LOADING PROCEDURE

Figure 4:
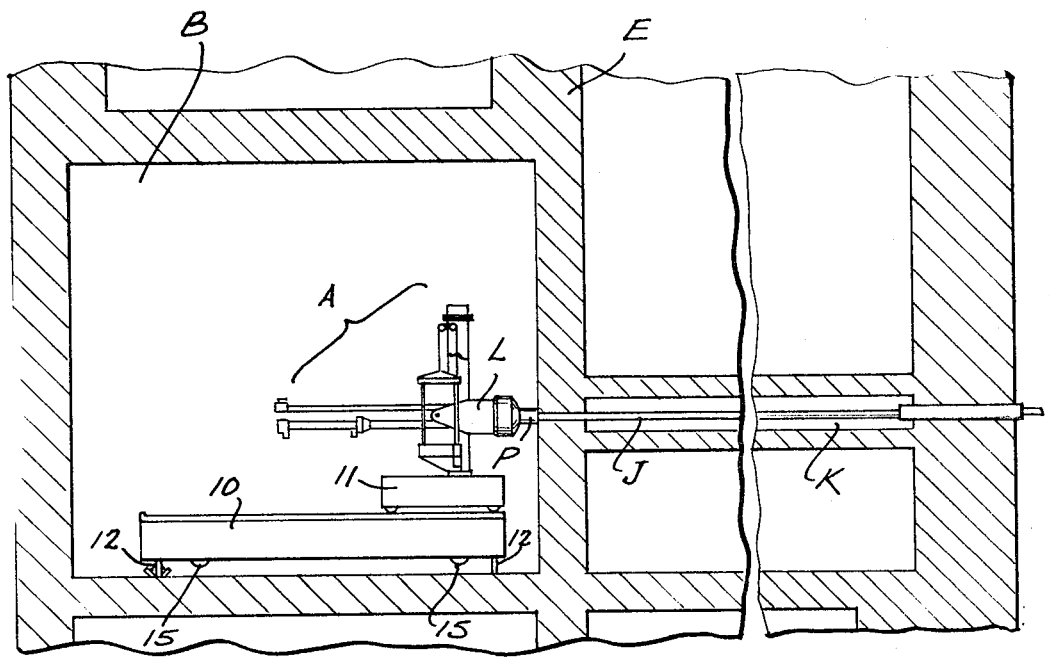
FIG. 4 is a cut-away elevation view seen on line IV—IV in FIG. 1 with the movable parts shown in a different position.

In order to exchange the used fuel string in a fuel channel D with a fresh fuel string, the carriage 10 is moved to the upper end of the rails 13 (FIG. 1) and the fuelling machine head L is placed horizontally at the height of the fuel transfer tubes J. The trolley 11 is then moved on the carriage 10 to the right to engage a snout portion P of the fuelling machine head L with the end of one of the transfer tubes J, as shown in FIG. 4. In this position, the cable spans 22, 22a hang down loosely, while the cable span 23 is in its most extended position. A fresh fuel string is pushed into the fuelling machine A, e.g. by a ram located within the fuel transfer tube J behind the fuel string.

The trolley 11 is then moved to the left in FIG. 1 to disengage the snout P from the transfer tube J and to a position that corresponds to the location of the fuel channel that is to be refuelled. The carriage 10 is now moved back to the right in FIG. 3 to match the location of the selected fuel channel in this direction, and simultaneously with or subsequently to this motion, the fuelling machine head L is rotated into its vertical position. In the next step, the fuelling head L is shifted upwardly along the columns 20 to connect the snout P to the selected fuel channel D, as shown in FIG. 2. In this position, the cable spans 22, 22a and 23 are more or less extended. The used fuel string is extracted from the selected fuel channel and the fresh fuel string is inserted.

The used fuel string now contained in the fuelling machine A is delivered by shifting the fuelling machine head L downwardly along the columns 20, rotating the machine head into its horizontal position, moving the carriage 10 to the left in FIG. 3, displacing the trolley 11 to the right in FIG. 4 and connecting the snout P to an empty one of the fuel transfer tubes J. The used fuel string is pushed into transfer tube J by a ram within the fuelling machine A. The fuelling machine is then ready for a further reloading cycle.

Alternatively, during the last step of the reloading cycle, the snout P of the fuelling machine may be connected to a full fuel transfer tube J and a fresh fuel string loaded into the machine before unloading the used fuel string into the same transfer tube J.

Equipment (not shown) is provided in the fuel shuffling bay H for rearranging the sections of which the fuel strings are made up, and in many instances for replacing at least some of these used sections by fresh ones.

WITHDRAWAL OF FUELLING MACHINE INTO MAINTENANCE BAY

In the event of a malfunction of the fuelling machine or for routine preventative maintenance, the fuelling machine A is moved from the fuelling vault B into the maintenance bay F by performing the following steps. The fuelling machine head L is rotated into its horizontal position and shifted downwardly along the columns 20. The trolley 11 is moved to the right hand end of the carriage 10 adjacent to the post 21. The carriage 10 is moved to the lower end (FIG. 1) of the rails 13 thereby inserting the vertical pin 28 into the bracket 26 to couple the trailer 24 to the post 21. In this condition, the cable spans 22, 22a and 23 hang down loosely. The wheels 15 are then lowered to engage the tracks 16 thereby disengaging the wheels 12 from the rails 13. Now the door M and the shielding gate Y are shifted to their open positions. As the carriage 10 moves along the tracks 16, the trailer 24 is pushed along the rails 25. This motion comes to an end when the wheels 36 on the trailer extension 34 have moved down the curved extension 29 of the inner rails 25a. The door M is now closed and the shielding gate Y is lowered into the above mentioned first closed position. The fuelling machine A is now in the condition shown in FIG. 5 in which all of the cable spans 22, 22a, 23 and 30 hang down loosely. To move the fuelling machine A back into the fuelling vault B, the above described steps are performed in inverted order.

I claim:
1. A nuclear reactor installation comprising
   (a) a reactor having a plurality of fuel channels,
   (b) a fuelling cell adjacent said reactor, said fuel channels extending into said fuelling cell,
   (c) a maintenance cell adjacent said fuelling cell,
   (d) a passage between said fuelling cell and said maintenance cell and means for tightly closing said passage,
   (e) a fuelling machine for loading and unloading said fuel channels, including means for moving said fuelling machine in a direction between said cells through said passage, and
   (f) power supply means including conductor means mounted in one of said cells, flexible cable means connecting said fuelling machine to said conductor means and means movable in said direction for supporting said cable means hanging freely between said fuelling machine and said conductor means to avoid interference of said cable means with said motion of the fuelling machine,
   (g) wherein said cable supporting means comprises trailer means including means for moving said trailer means between a first position in said passage and a second position in one of said cells, said cables forming a first span between said conductor means and said trailer means, and a further span between said trailer means and said fuelling machine.
2. An installation as in claim 1, wherein said means for moving the trailer means comprise first coupling means mounted on said trailer means and second coupling means mounted on said fuelling machine for cooperating with said first coupling means.
3. An installation as in claim 2, comprising means for moving said fuelling machine in a second direction perpendicular to the first-mentioned direction, said coupling means being disposed to interengage upon movement of said fuelling machine in said second direction.
4. An installation as in claim 3, wherein said means for moving said fuelling machine comprise a carriage, for travel in said first and second directions, a trolley supported on said carriage and means for moving said trolley relatively to said carriage parallel to said first direction, said fuelling machine being mounted on said trolley, said cable supporting means including a post mounted on said carriage, said post dividing said further cable span into a second span between said trailer means and said post and a third span between said post and said fuelling machine.
5. An installation as in claim 1, wherein said means for moving said trailer means comprises rail means mounted in one of said cells, and wherein said trailer means engages said rail means and comprises a cart and a portion connected to said cart for extending through said passage for guiding said cable means.
6. An installation as in claim 5, wherein an end of said rail means remote from said passage comprises a downwardly extending curved track, said trailer portion being pivotally connected to said cart and engaging said curved track when the fuelling machine is in said one cell.
7. A nuclear reactor installation comprising
   (a) a reactor having a plurality of fuel channels,
   (b) a fuelling cell adjacent said reactor, said fuel channels extending into said fuelling cell,
   (c) a maintenance cell adjacent said fuelling cell,
   (d) a passage between said fuelling cell and said maintenance cell and means for tightly closing said passage,
   (e) a fuelling machine for loading and unloading said fuel channels, including means for moving said fuelling machine in a direction between said cells through said passage, and

(f) power supply means including conductor means mounted in one of said cells, flexible cable means connecting said fuelling machine to said conductor means and means movable in said direction for supporting said cable means hanging freely between said fuelling machine and said conductor means to avoid interference of said cable means with said motion of the fuelling machine, (g) wherein said passage comprises a main opening for said fuelling machine and an additional opening connected to said main opening for said cable means, and wherein said closing means comprise a door for closing said main opening and gate means for closing said additional opening.

8. An installation as in claim 7, wherein said gate means comprise slider means and actuation means for moving said slider means to an open position, to a first closed position, when said cable means extends through said additional opening, and to a second closed position when said fuelling machine is in the cell containing said conductor means.

9. An installation as in claim 8, wherein said cable supporting means comprise a pair of rails extending through said additional opening and trailer means engaging said rails and having a portion disposed between said rails for guiding said cable means through said additional opening, said cable means being embedded within said portion, and wherein said slider means comprise a first slider for closing the part of said additional opening between said rails and second and third sliders for closing the parts of said additional opening above said rails.

10. A nuclear reactor installation comprising
(a) a nuclear reactor having a plurality of fuel channels,
(b) a fuelling cell adjacent said reactor, said fuel channels extending into said fuelling cell,
(c) a maintenance cell adjacent said fuelling cell,
(d) a passage between said fuelling cell and said maintenance cell and means tightly closing said passage,
(e) a fuelling machine for loading and unloading said fuel channels, including means for moving said fuelling machine in a first direction between said cells through said passage and in a second direction perpendicular to said first direction, said moving means comprising a carriage movable in said first and second directions and a trolley supported on said carriage and movable relatively to said carriage in a direction parallel to said first direction, said fuelling machine being mounted on said trolley, (f) power supply means including conductor means mounted in said maintenance cell, a plurality of flexible cables connecting said fuelling machine to said conductor means and means supporting said cables, (g) said cable supporting means including a post mounted on said carriage, a pair of rails extending in said first direction across said maintenance cell and through said passage, a trailer engaging said rails and means for coupling said trailer to said carriage to move said trailer along said rails upon movement of said carriage between said cells, a first span of said cables hanging freely between said conductor means and said trailer, a second span of said cables hanging freely between said trailer and said post, and a third span of said cables hanging freely between said post and said fuelling machine, (h) said closing means including a door, gate means having a first slider for closing the part of said passage between said rails and second and third sliders for closing the part of said passage above said rails, and a portion of said trailer disposed between said rails for guiding said cables through said passage, said cables being embedded within said portion.

References Cited

UNITED STATES PATENTS

| | | | |
|---|---|---|---|
| 3,194,742 | 7/1965 | Aubert et al. | 176—30 |
| 3,196,082 | 7/1965 | Lemesle et al. | 176—30 |

CARL D. QUARFORTH, Primary Examiner

H. E. BEHREND, Assistant Examiner

U.S. Cl. X.R.

214—18